Oct. 18, 1955 F. ERDELYI ET AL 2,720,801
ROLLING HEAD
Filed Déc. 19, 1951 5 Sheets-Sheet 1
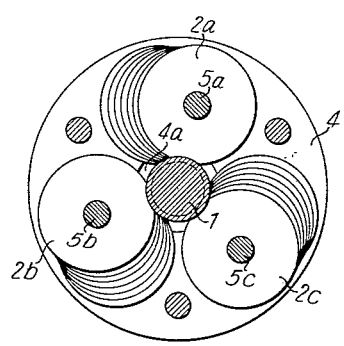
Fig. 1
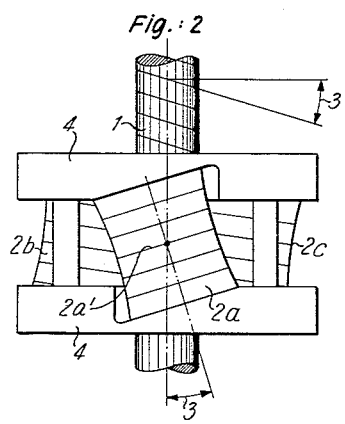
Fig. 2
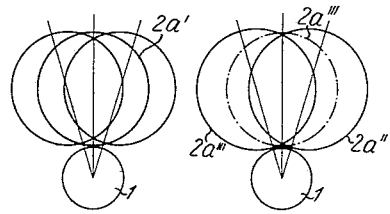
Fig. 3  Fig. 4
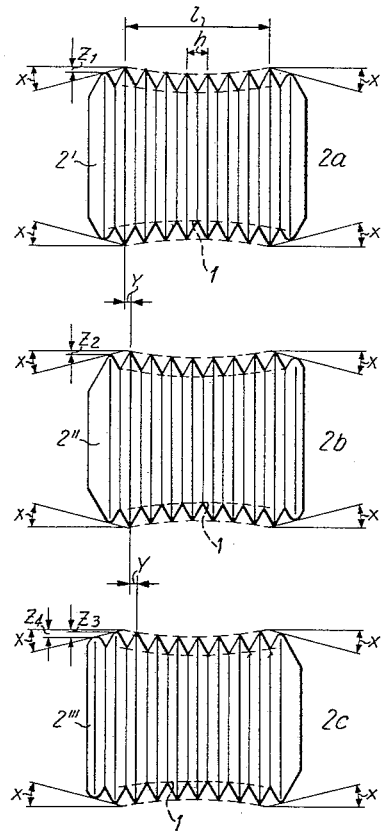
Fig. 5
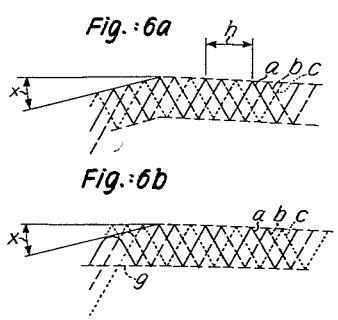
Fig. 6a
Fig. 6b
INVENTOR:
FERENC ERDÉLYI
KARL STEENHOLDT
BY
ATTORNEY.

Oct. 18, 1955  F. ERDÉLYI ET AL  2,720,801
ROLLING HEAD
Filed Dec. 19, 1951  5 Sheets—Sheet 2
Fig.: 7
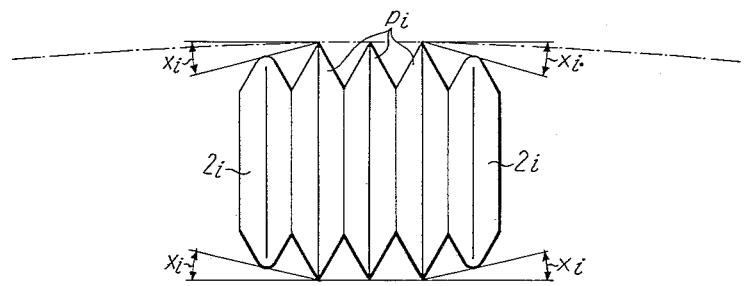
Fig.: 8
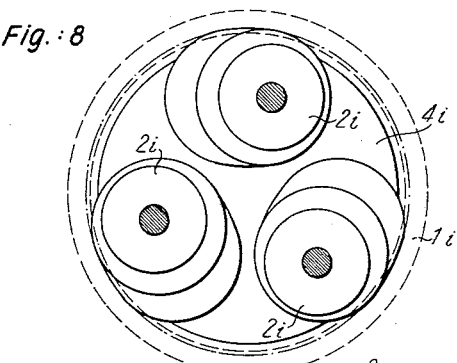
Fig.: 9
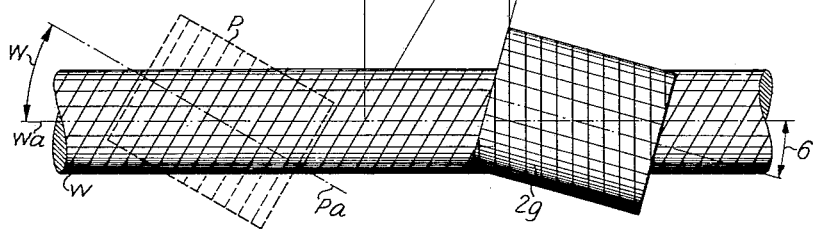
INVENTOR:
FERENC ERDÉLYI
KARL STEENHOLDT
BY
K. A. Mayr
ATTORNEY.

Oct. 18, 1955  F. ERDÉLYI ET AL  2,720,801
ROLLING HEAD
Filed Dec. 19, 1951  5 Sheets-Sheet 3
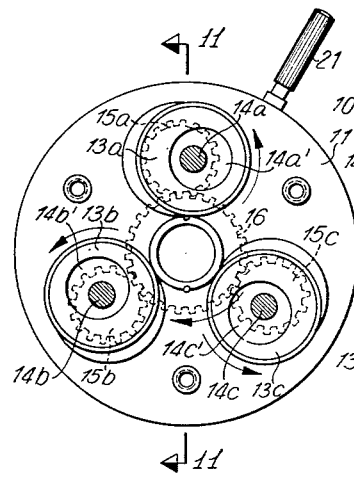
Fig.: 10
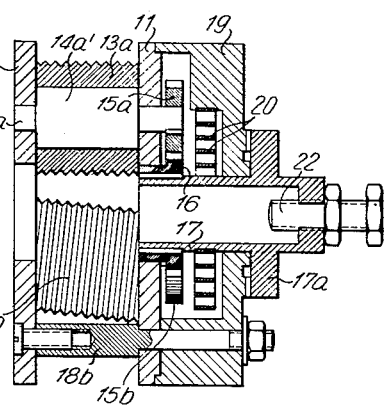
Fig.: 11
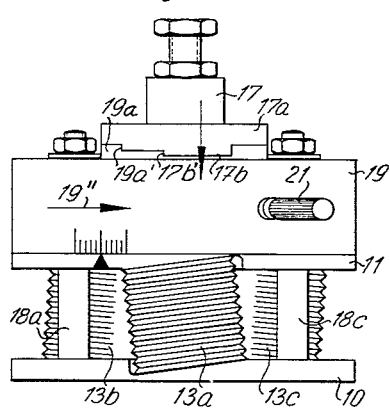
Fig.: 12
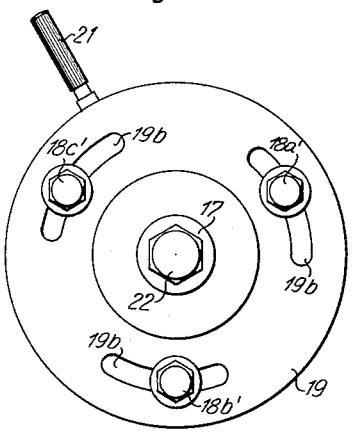
Fig.: 13
*INVENTOR:*
*FERENC ERDÉLYI*
*KARL STEENHOLDT*
BY K. A. Mayr
ATTORNEY.

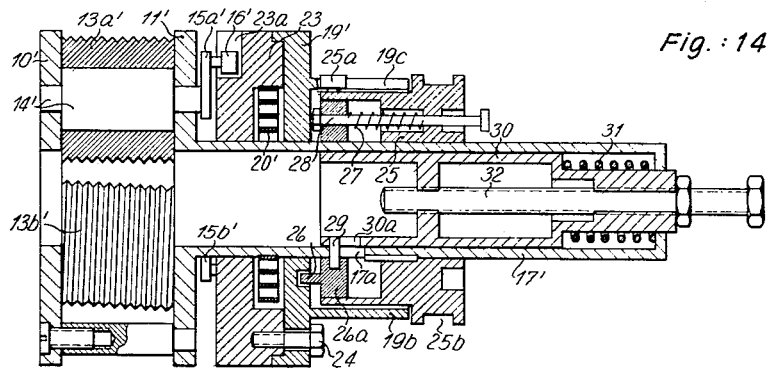
Fig.:14
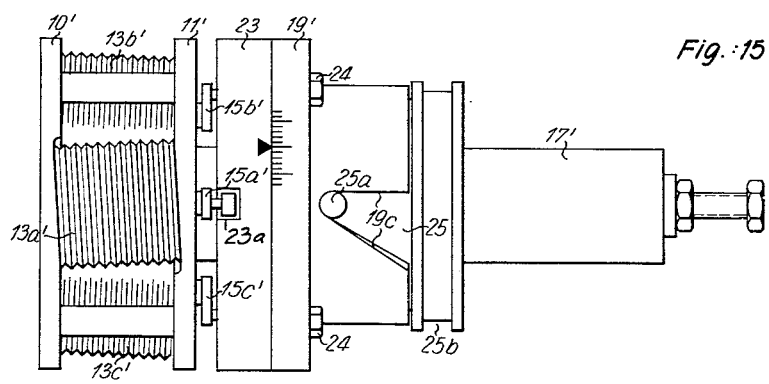
Fig.:15
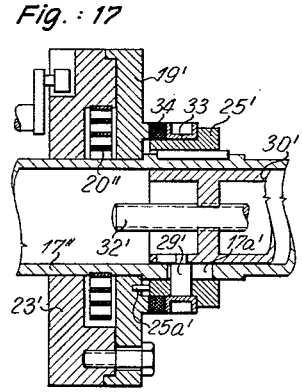
Fig.:17
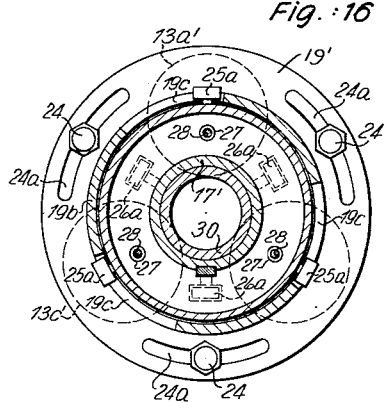
Fig.:16
INVENTOR:
FERENC ERDÉLYI
KARL STEENHOLDT
BY
K. B. Mayr.
ATTORNEY.

Oct. 18, 1955  F. ERDÉLYI ET AL  2,720,801
ROLLING HEAD
Filed Dec. 19, 1951  5 Sheets-Sheet 5
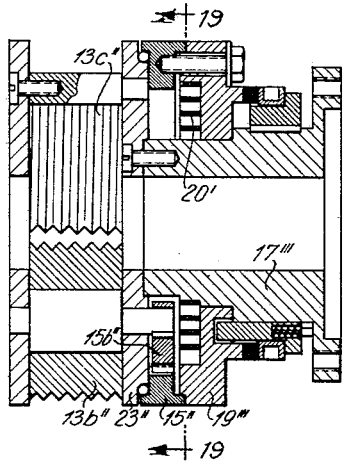
Fig.: 18
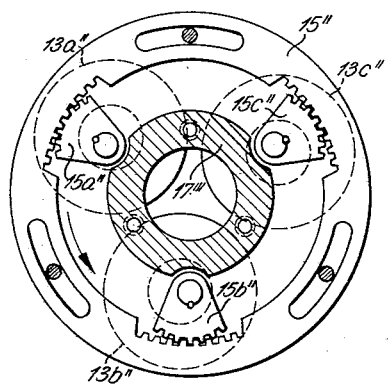
Fig.: 19
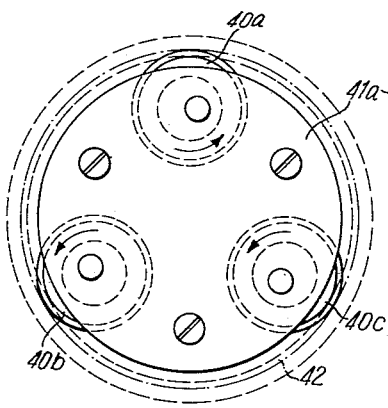
Fig.: 20
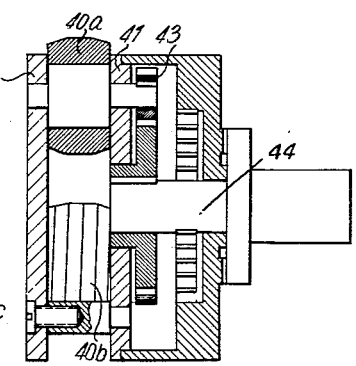
Fig.: 21
INVENTOR:
FERENC ERDÉLYI
KARL STEENHOLDT
BY
K. B. Mayr
ATTORNEY.

United States Patent Office 2,720,801
Patented Oct. 18, 1955

2,720,801

ROLLING HEAD

Ferenc Erdélyi, Hamburg, and Karl Steenholdt, Hamburg-Altona, Germany, assignors to Wilhelm Fette Prazisionswerkzeug-Fabrik, Hamburg-Altona, Germany Application December 19, 1951, Serial No. 262,378

1 Claim. (Cl. 80—6)

The present invention relates to an improved apparatus for rolling external and internal profiles.

For rolling threads, besides threaded jaws and other tools, press rolls have been proposed, arranged concentrically around the workpiece, which rolls are supported in a holder to rotate freely about their axes independently one from the other. The rolls are provided on their peripheries either with threaded portions corresponding to the threads to be produced or with grooves extending parallel one to the other at right angles to the roll axis, which are offset one to the other by a fraction of the pitch to be rolled corresponding to the number of rolls.

In every case the thread is produced by pressure directed radially to the workpiece so that special machines are required for thread rolling. According to the invention, however, the workpiece is moved relatively to the rolls or the latter are moved relatively to the workpiece, in the axial direction of the workpiece, in such manner that the axial pressure produced by rolling advances the workpiece or the rolls by penetrating the outer surface of the workpiece. For this purpose the profile rolls are supported in a holder in such manner that their axes are inclined to the axis of the workpiece at an angle corresponding to the mean pitch of the thread to be rolled.

As a result of this inclined positioning of the rolls to the workpiece axis, on rolling external profiles, only those profile ridges penetrate completely into the workpiece, which are disposed in the middle of the rolls. In order to avoid the resulting overloading of these profiles and to afford registration of the rolled thread with the profiles located away from the middle of the rolls, the periphery of the rolls according to the invention is made concave to an extent which affords a complete contact of the rolls with the workpiece. In order to avoid immediate loading of the first roll profile which engages the work with the full forming pressure, the end profile of each roller according to the invention is less high than the other profiles so that the desired thread depth is produced after passage of the first profile of each roll, effecting a gradual rolling process.

So far as the invention is concerned with the rolling of internal profiles the rolls are convexly formed on their periphery corresponding to the inner diameter of the workpiece and are provided with corresponding entry and exit portions so that only the mid-profile sections roll the profile to the full depth.

The advantages of a profile rolling process with such rolls are very great. Apart from the fact that the roll supports can be fitted to existing machine tools in that, for example, the roll supports can be mounted on the saddle or slide of a lathe and the workpiece in the chuck or vice versa, according to the invention not only external and internal threads of all kinds but also other internal and external profiles can be rolled in a run-through or continuous process. If, for example, when rolling external threads with a very large pitch angle the intersection angle between the workpiece axis and the roll axis must be so great that the end roll profile can no longer engage the workpiece. The profile to be rolled is produced by means of a spiral or a rifling on the rolls and the angle formed by the roll axis and the axis of the workpiece no longer corresponds to the pitch angle of the profile to be rolled but is only so great that the rotating workpiece can be fed in the axial direction to the roll or conversely the roll fed to the stationary workpiece. The pitch angle of the roll profile is determined by the difference between or the sum of the pitch angle of the profile to be rolled and the application angle of the roll axis according to whether the profile is to be rolled as a left-hand or right-hand thread. Depending on the size of the pitch angle of the spiral or rifle-like roll profile on the one hand and on the size of the application angle of the roll axis, according to the invention, a great variety of profiles, external or internal, can be rolled on a workpiece.

For removal of the workpiece after a desired profile length has been rolled thereon, the rolls can be moved back from their working position so that the workpiece can be removed without being rotated. The rolls are mounted on their holders by means of laterally movable spindles, the lateral movement being effected by expansion of a stressed spring, which, after completion of the rolling process, is released and moves the rolls by a suitable drive out of engagement with the rolled profile of the workpiece.

The rolling process according to the invention and apparatus for performing it are illustrated in and preferred embodiments are further described below with reference to the accompanying drawings wherein:

Fig. 1 is a diagrammatic front view of a holder with three rolls with the end cover cut away, Fig. 2 shows the same holder from above, Figs. 3 and 4 are diagrams explaining the concave formation of the rolls, Fig. 5 shows the three rolls forming part of the device shown in Figs. 1 and 2 on an enlarged scale and located one under the other, Figs. 6 and 6b represent diagrammatically the stepwise rolling action.

Figs. 1 to 6 show the rolling of external profiles while Figs. 7 and 8, which correspond to Figs. 1 and 5, show the rolling of internal profiles.

While in Figs. 1 to 8 the profile of the rolls comprises annular ribs and grooves which are parallel one to the other and perpendicular to the roll axis, Fig. 9 diagrammatically illustrates the production of a profile having the form of a spiral or rifling.

Figs. 10 to 13 show a constructional embodiment of a thread rolling head for external threads with an automatic device for removing the three rolls from the workpiece, Fig. 10 showing the device in end view, Fig. 11 in section along line 11—11 in Fig. 10, Fig. 12 being a plan view, and Fig. 13 a rear view of the device.

The apparatus according to Figs. 10 to 13 is intended for a rotating workpiece and for fitting for example, to the saddle or slide of a lathe and does not rotate, while Figs. 14 to 16 are longitudinal sectional plan, and cross section views, respectively, of a device which is rotated for rolling a stationary workpiece, and which can be fitted, for example, to the chuck of a lathe.

Fig. 17 shows a partial longitudinal section through a third embodiment and Figs. 18 and 19 a longitudinal section and a cross section on line 19—19 of Fig. 18, respectively, of a fourth embodiment.

The apparatus according to Figs. 10 to 19 are intended for rolling external threads, for example, while Figs. 20 and 21 show end and longitudinal sectional views, respectively, of a device suitable for rolling internal threads.

In Figs. 1 and 2, numeral 1 indicates the workpiece and numerals 2a, 2b, 2c designate three profile rolls arranged around the workpiece and being freely rotatable on spindles 5a, 5b, 5c, respectively. In all the cases described hereinafter the axes of the freely rotatable rolls are located in planes parallel to the axis of the workpiece and form an angle 3 with the axis of the workpiece which is shown in Fig. 2.

If rolls 2a, 2b, 2c are provided with a profile and either the rolls are applied around a stationary workpiece or if a rotating workpiece is inserted through the opening 4a of a stationary roll holder 4 between the rolls 2a, 2b, 2c, the rotating holder 4 screws by its rolls onto the workpiece 1 or the rotating workpiece 1 screws into the rolls, respectively.

In Figs. 1 to 6 the profile to be rolled, for example, an external thread, is produced by annular parallel grooves on the rolls 2a, 2b, 2c, which grooves are perpendicular to the roll axis. These grooves of the three rolls 2a, 2b, 2c are seen in Fig. 5 and are shown on a larger scale one below the other for better understanding. As shown in Figure 5, the ribs between the grooves of the three rolls are relatively offset by a fraction $y$ of the pitch $h$ of the thread to be rolled corresponding to the number of rolls arranged around the workpiece. If, as shown, three rolls 2a, 2b, 2c are provided, the measure $y$ is thus $\frac{1}{3}h$.

If all the ribs of the rolls 2a, 2b, 2c were equally high, the full forming work would be done by the first rib and groove of the first roll engaging the workpiece 1, while the following ribs and grooves would only register the workpiece without doing more than correcting previous rolling faults. Moreover, the first roll profile would be overloaded and would soon become worn. Therefore, according to the invention the end ribs 2', 2'', 2''' have a different diameter so that the rolls are provided with sloped entry and exit sections. The size of the slope angle is chosen according to the character or hardness of the workpiece 1 and is smaller the harder the material is in which the roll profile is to penetrate. Depending on the size of the angle $x$ and the pitch $h$ various heights Z1, Z2, Z3, Z4 of the end ridges 2', 2'', 2''' are obtained. On the basis of a suitable uniform length of the rolls, 2a, 2b, 2c, the roll 2a has the same diameter at both ends and the rolls 2b and 2c have end profile ridges of different diameters whereby the left hand end of the roll 2b corresponds to the right hand end of the roll 2c and the right hand end of the roll 2b to the left hand end of the roll 2c. If therefore the left hand faces of the three rolls are worn the roll 2a can be reversed on its spindle 5a (Fig. 1), the roll 2b mounted on the spindle 5c and roll 2c mounted on the spindle 5b so that the other ends of the three rolls are used for rolling.

Because of the different heights of the rolling ridges 2', 2'', 2''', rolling of the thread is gradually effected as seen from Figs. 6a and 6b, in which $a$ represents the profile ridge path of the roll 2a, $b$ that of the roll 2b, and $c$ that of the roll 2c. Letter $x$ indicates the run-on angle. The smaller this angle is the greater is the number of steps necessary to roll the full thread depth.

As seen in Figs. 5 and 6a, the peaks as well as the bottoms of the end profile ridges 2', 2'', 2''' are set back stepwise in relation to the regular pitch $h$ by the amount tan $x$. Thereby the profile bottom is displaced from the centre of the profile whereby a certain amount of inaccuracy in the rolled thread is obtained. It is therefore preferred to set back only the ridge tops (Fig. 6b) according to the run-on angle $x$ while the profile bottom $g$ is at the same or nearly the same radius as that of the other grooves. The accuracy of the roller thread is thereby considerably increased. The profile ridge is rounded in order to produce a good material flow at the workpiece surface and to avoid damage of the profile flanks. The rounding radius is determined by the width of the top surfaces of the profile ridges and by the angularity of the profile flanks.

Since the rolls are positioned obliquely to the axis of the workpiece 1 at the angle 3 (see Fig. 2) only those profile ridges 2a' can pentrate completely into the workpiece 1 which are at the intersection of the rolls and the workpiece axis so that only this profile completely rolls the thread. Fig. 3 shows that only the profile 2a' comes into contact with the workpiece 1 while the profile ridges positioned towards the ends of the rolls are increasingly separated from the workpiece surface. The invention therefore provides a correction of the rolls 2a, 2b, 2c insofar as the roll profile in the central portion $l$ (see the dotted lines 1' in Fig. 5) is made concave by an amount which affords full engagement of the rolls with the periphery of the workpiece 1. Fig. 4 shows how, in contrast to Fig. 3, all the profile lying in the section $l$ of the roll uniformly engages the periphery of the workpiece 1. Since the whole of this profile portion can penetrate into the workpiece 1 to the full thread depth an acceptable registration is obtained.

The conditions for rolling internal threads are similar to those described above for rolling external threads.

Fig. 7 shows a roll for rolling internal threads wherein $xi$ indicates the run-on and run-off angle and $2i$ designates the end ribs whose tops are offset correspondingly to this angle. In this case the roll must be made convex so that all profiles of the centre section penetrate to the same extent into the workpiece. According to the fineness of the thread and the size of the pitch, two or more of the profile ridges $pi$ in the centre of the roll complete production of the internal thread. The rolls for producing internal profiles are also arranged at the same radius around the workpiece axis as shown in Fig. 8 and are set at an angle thereto which corresponds to the pitch of the internal thread to be rolled. Three rolls $2i$ may be provided, for example. Only two, or more than three rolls may be provided in the holder $4i$.

It will be clear from the previous description that with the rolls described, whose profile ridges are at a right angle to the roll axis and parallel one to the other, various external and also internal threads can be rolled, but only insofar as the pitch angle of the thread to be rolled is within normal limits. If the pitch of the thread to be rolled is very great, the angle $w$ (Fig. 9) formed by the axis $Wa$ of the workpiece W and by the axis $Pa$ of the profile roll P is so great that the end profile of the profile roll can no longer engage the workpiece. In such cases the profile is in the form of a spiral or rifling on the rolls. Such a roll $2g$ is shown diagrammatically in Fig. 9. In this case the run-on angle 6 formed by the roll $2g$ and the workpiece W need no longer correspond to the pitch angle 7 of the profile to be rolled but need only be so great that the workpiece is advanced through the rolls $2g$ arranged therearound. The pitch angle 8 of the spiral profile on the roll $2g$ is determined by the difference between or sum of the pitch angle 7 of the profile to be rolled and the run-on angle 6 formed by the roll $2g$ and the workpiece W depending whether the profile is to be rolled as a left hand or a right hand thread on the workpiece.

If a profile is to be rolled into a workpiece W with such profile rolls $2g$ the workpiece does not move through the rolls $2g$ with a force corresponding to the pitch angle 7 of the profile to be produced, but is advanced at a reduced speed. Depending on the size of the pitch angle 8 of the spiral or rifled roll profile and on the run-on angle 6 formed by the roll $2g$ and the workpiece W various profiles may be rolled into the workpiece W. Thus it is possible to produce, besides multiple threads of desired pitch, also spur gear wheels, helical gear wheels or the like or to roll profiles extending more or less in the direction of the workpiece axis or parallel thereto so that according to the invention, for example, also keyways, grooves and splines, twist drills, reamers and the like can be rolled. If, for example, the run-on angle 6 is equal to the pitch angle 8 of the roll profile, spindles, discs or other workpieces may be rolled having profiles positioned parallel one to the other and perpendicular to the workpiece axis. It is, however, by no means a necessary condition that the spiral or rifling on the rolls 2g arranged around the workpiece W shall be of the same hand and need not always have the same pitch angle 8; the profiles of the rolls 2g may be opposed and/or have a different pitch. Thereby profiles extending cross-wise, such as crossed-teeth, knurling or the like, may be rolled into the workpiece.

In all the previously described cases the forming action necessary for producing the desired workpiece profile occurs in the direction of the longitudinal axis of the workpiece whereby, in contrast to the known forming processes, which operate in the radial direction of the workpiece, considerable increase in the strength of the outer surface of the workpiece is obtained, especially at the profile peaks, and the finished workpiece leaves the machine with a polished surface. For heavy forming operations it may be necessary to pre-heat the workpieces.

In the foregoing the theory of the invention has been explained and hereinafter devices will be described which are suitable, for example, for rolling threads. In all the constructional examples shown it is especially important that the rolls are adjustable in their holders in order to permit adjustment to the various diameters of the workpiece. Moreover, all modifications of rolling heads according to the invention are provided with means for automatically removing the rolls from the workpiece when rolling is completed. If this inherently desirable feature is omitted, the rolls can also be arranged non-adjustably in a ring housing as is known for example, for so-called thread dies (or taps) so that the assembly may be arranged as a "rolling die" or "rolling tap" in a die stock or in a lathe chuck.

In the arrangements shown in Figs. 10 to 21 the holder for the rolls is formed as a so-called rolling head. This comprises, according to Figs. 10 to 13, for example, three rolls 13a, 13b, 13c supported between two bearing plates 10 and 11. The spindles 14a, 14b, 14c of the rolls 13a, 13b, 13c are provided with eccentrics 14a', 14b', 14c' on which the rolls are journalled in a freely running manner by needle-roller, ball or other bearings (not shown). The pins at the ends of the spindles 14a, 14b, and 14c journal the spindles obliquely in the plates 10 and 11, as already explained for Figures 1–9. The pins at the ends of the spindles 14a, 14b, 14c extending through the bearing plate 11 are provided with pinions 15a, 15b, 15c, which engage a gear wheel 16 coaxially with the workpiece axis, which wheel is journalled on the plate 11 and secured against withdrawal, its bore being provided with a multi-spline profile so that it can slide in axial direction on a splined shaft 17. The teeth on the gears 15a, 15b, 15c, and on the central gear wheel 16 are preferably at a slight angle, in accordance with the oblique setting of the spindles, in order to obtain proper meshing of the gears.

The two bearing plates 10 and 11 are spaced one from the other by screw bolts 18a, 18b, 18c which also serve for fastening a housing member 19 enclosing the gear wheels 15a, 15b, 15c and 16. For this purpose slots 19b (Fig. 13) are provided in the housing 19 through which extend the threaded ends of the bolts 18a, 18b, 18c. By tightening the nuts 18a', 18b', 18c', the housing 19 is fastened to the bearing plate 11 (see also Fig. 12). In the housing 19, which, together with the bearing plates 10 and 11, forms one half of the clutch of the rolling head, is disposed a spiral spring 20 whose outer end is connected with the housing 19 and whose inner end is fixed to the hollow shaft 17, which, with its flange 17a, represents the other half of the clutch of the rolling head. The housing 19 (Fig. 12) is provided with claws 19a and the flange 17a is provided with counter claws 17b. The spiral spring 20 is so constructed and tensioned that on the one hand by its spiral spring pressure to rotate the shaft 17 and with it the gear wheel 16, and the gear wheels 15a, 15b, 15c in engagement therewith, in the direction indicated by arrows in Fig. 10 and to remove the rolls 13a, 13b, 13c from the workpiece. The spring 20 also tends to hold the two mating parts of the clutch claws 17b, 19a in the engaged position. The housing 19 is provided with a handle 21.

The method of operation of the rolling head is as follows: After the nuts 18a', 18b', 18c' have been loosened, gear wheel 16 is rotated by rotation of the housing 19 together with the shaft 17. Wheel 16 rotates the gear wheels 15a, 15b, 15c and the eccentrics 14a', 14b', 14c', causing spreading of the rolls to the diameter of the workpiece to be threaded and affording adjustment of the roll pressure. For facilitating adjustment a scale is provided on the housing 19 which cooperates with an index mark on the plate 11. Thereupon the nuts 18a', 18b', 18c' are tightened and the shaft 17 of the rolling head is, for example, clamped to the carriage or saddle support of a lathe. The rolling head then is caused to run onto the workpiece rotating in the lathe chuck, the grooves of the freely rotating rolls 13a, 13b, 13c, positioned obliquely as already explained, rolling a continuous thread in the workpiece. The ribs of each roll press successively into the rotating workpiece which works itself between the rolls 13a, 13b, 13c until it abuts against the end of an adjustable bolt 22, whereupon the claws 19a of the clutch part 19, 11, 10 are withdrawn out of the range of the claws 17b of the clutch half 17, 17a secured to the lathe carriage, against the axial action of the spring 20 in the direction of the vertical arrow in Fig. 12 and the parts forming the clutch half 19, 11, 10 rotate relatively to the clutch half 17, 17a due to the action of the roll pressure whereupon the spring 20 rotates the pinions 15a, 15b, 15c which roll on the stationary gear wheel 16. This causes rotation of the eccentrics 14a', 14b', 14c' and removal of the rolls 13a, 13b, 13c from the workpiece.

The relative rotation of the two halves of the clutch must be limited so that the rolls 13a, 13b, 13c, may be returned to their starting position. To effect this, the claws 19a are arranged stepwise so that on release of the clutch and rotation of the housing 19 in the direction 19 (see Fig. 12) the flanks 19a' of the claws 19a strike the stationary flank 17b' of the claws 17b and so limit the rotation of the clutch part 19, 11, 10.

If threads of great length are to be cut, the stop bolt 22 is omitted so that the rolled workpiece can pass through the hollow shaft 17. Release is effected in this case conveniently by means of an adjustable stop on the carriage of the latter (not shown).

Instead of the spring 20 operating both as a spiral spring and as an axial compression spring, two springs may be provided, one of which provides the axial spring pressure in the manner of a coil spring. Instead of the claws 17b, 19a other conventional clutch elements may be provided. It is of importance that the shaft 17 shall be connected with the gear wheel 16 by means of multiple splines. Since it is advisable for protecting the inside of the clutch to limit the length of the adjusting slots 19b, it is desirable that the gear wheel 16 can be reset, i. e. rotated, on the shaft 17 to increase the opening of the rolls 13a, 13b, 13c if the workpiece has a greater diameter.

The rolling head described above is adapted to be mounted on a suitable machine tool in which the workpiece rotates. It can, however, also be arranged that the workpiece is fixed and the head rotates. In this case, after each release of the clutch the rolling head must be stopped for reengaging the clutch.

In order to avoid this, in the construction according to Figs. 14 to 17, the rotated clutch half 19', transmitting the torque of the shaft 17', is axially slidably supported on the shaft 17' and serves as the control member for the clutch.

As seen in Figs. 14 to 16, three rolls 13a', 13b', 13c' are freely rotatable between two bearing plates 10' and 11' on eccentrically journalled shafts 14'. The latter can be rotated by means of cranks 15a', 15b', 15c' in such manner that, when required, the rolls 13a', 13b', 13c' can be removed from the workpiece, not shown. For this purpose the pins at the free ends of the cranks 15a', 15b', 15c' are provided with die blocks 16' guided in substantially radial slots 23a of a disc 23 connected by means of bolts 24 with the disc 19' and rotatable together with the latter about the hollow shaft 17'. The bolts 24 are located in arcuated slots 24a (see Fig. 16) of the disc 19', so that the relative position of the discs 23 and 19' can be adjusted after slackening the bolts 24. In the housing formed by members 23 and 19' is located a spiral spring 20' secured at one end to the housing member 23 and at the other end to the shaft 17'.

In a tubular part 19b extending coaxially of and from the disc 19' is provided a control member 25 which is slidable in part 19b and is held against rotation relative to part 19b by means of one or more rollers 25a guided in recesses 19c of part 19b, the recesses being provided with an inclined surface (see Fig. 15). A clutch element 26 is slidable in the control member 25 against springs 27 which are arranged around guide bolts 28. These springs 27 tend to hold the coupling element 26 with its claws 26a in corresponding recesses of the disc 19' and are tensioned when the clutch element 26 is moved toward the control element 25. The clutch element 26 is provided with pins 29 guided in slots 17a of the shaft 17' and in slots 30a of a sleeve 30 which is slidable in the shaft 17' against a spring 31 and to which a threaded bolt 32 is connected which is placed coaxially of and screwed into flange portions of sleeve 30. The position of bolt 32 relatively to the sleeve 30 can be longitudinally adjusted and the bolt fixed in the adjusted position by means of a nut.

The method of operation of this rolling head, which may be fixed, for example, by its shaft 17, in a lathe chuck, is as follows: As in the embodiment according to Figs. 10 to 13, for adjustment of the desired thread, first the bolts 24 are loosened and the relative position of the members 23' and 19' is adjusted, the relative position being indicated by a scale and index (see Fig. 15). After tightening the bolts 24, the rolling head is ready for operation. If the clutch is engaged as shown, the rolls 13a', 13b', 13c' roll on the workpiece and roll the thread in its outer surface. When the workpiece hits the bolt 32 which has been previously adjusted according to the thread length desired, the sleeve 30 is pushed to the right in Fig. 14 against the spring 31, whereby the pin 29 slides along the slots 17a of the shaft 17' and the claws 26a of the clutch element 26 are withdrawn from the disc 19'. Due to the rolling pressure and the action of the spiral spring 20' in the housing 19', 23, the latter is rotated about the shaft 17', whereby, due to the inclination of a lateral surface of the slot 19c, the control element 25 is moved to the right of Fig. 15. By the rotary movement of the housing 19', 23, the blocks 16' of the cranks 15a', 15b', 15c' are moved radially in the slots 23a of member 23 and the cranks and the eccentric shafts of the rolls 13a', 13b', 13c' are rotated in such manner that the rolls move away from the workpiece. The workpiece can now be drawn out of the head by hand or be automatically pushed out of the head—for example by means of the stop 32 returning toward its illustrated position—without stopping the shaft 17'.

Instead of the automatic disconnection described, the device can, if desired, be disconnected by hand at any time by means of a hand lever, not shown, journalled in the ring groove 25b of the control element 25. In this way, the latter, together with the coupling element 26, can be moved to the right of Figs. 14 and 15 whereby the same movements are initiated as are effected in the clutch disengaging procedure described in the paragraph next above, when the workpiece abuts against the bolt 32.

A slot 30a in the sleeve 30 permits this manual operation without moving the sleeve 30. Also in this case the rotating rolling head need not be stopped. The disengagement of the clutch and the termination of the rolling process is always effected instantaneously by the action of the rolling pressure and by the action of the spring 20' so that uniform thread lengths are produced on all work pieces.

If a new workpiece is to be threaded, with the shaft 17' running, the control element 25 is moved to the left of Figs. 14 and 15 whereby its roller 25a is pressed back along the incline of the recess 19c so that the discs 19', 23 are rotated back so far that, due to the action of the springs 27 the claws 26a enter into the corresponding recesses of the disc 19'. At the same time the spring 20' is tensioned and the rolls 13a', 13b', 13c' move back to the working position.

When producing very short threads, the clutch movement necessary for the re-engagement of the clutch, which movement is effected by the slanted surface of the recess 19c, should be as small as possible. To accomplish this, a friction clutch is provided, as shown in Fig. 17. The housing enclosing the spring 20" is designated by numerals 23', 19". One end of the spring 20" is secured to the disc 23' and its other end to the shaft 17". A sleeve 30' is slidable within the latter and is connected by pins 29' with a control element 25'. The pins 29' are guided in slots 17a' of the shaft 17". The control element 25' is guided in a bearing ring 33, which is provided with recesses for mounting a handle, not shown. The side of securing the hand grips and the ring 33 facing the housing disc 19' is provided with a brake lining 34.

When the threading operation is completed, the workpiece abuts against the stop 32' and the clutch claws 25a' are disengaged from the disc 19', the stop bolt, the sleeve 30' and, through the pins 29', the control element 25' moving to the right of Fig. 17, within the axially unmovable brake ring 33, 34. The spring 20" is now free to effect the control of the rolls in the same manner as in the device according to Figs. 14 to 16. If the rolls must be returned to the rolling position, the brake ring 33, 34 is pressed against the rotating disc 19' by means of a hand grip, not shown, so that the speed of the disc relatively to that of the shaft 17" is reduced. Thereby the same movements are initiated as are effected by the rollers 25a in the recesses 19c of the device shown in Figs. 14 to 16.

A similar construction is shown in Figs. 18 and 19. Instead of the shaft 17' (Figs. 14 to 16) or 17" (Fig. 17) a flange body 17''' is provided by means of which the rolling head can be attached to a thread rolling or cutting machine or to a lathe. The embodiment shown in Figs. 18 and 19 differs from those described previously in that, on releasing the clutch, the spring 20'''' causes rotation of the housing 23", 19''' in the same direction in which body 17''' is rotated. Instead of cranks, drive means in the form of toothed segments 15a", 15b", 15c" are provided on the spindles of the rolls 13a", 13b", 13c", which are eccentrically supported as in Figs. 10 to 13, the toothed segments engaging correspondingly internally toothed parts of a ring 15". When, on releasing the spring 20'''', Fig. 19, an annular member 15" rotates in the direction of the arrow, the toothed segments 15a", 15b", 15c", are rotated in the same direction and the rolls 13a," 13b", 13c" are removed from the workpiece because of their eccentric mounting.

Apart from this, the method of operation of the device according to Figs. 18 and 19 is the same as that of the other embodiments described. A ball bearing is preferably provided between the ring member 15" and the disc member 23".

All the previously described rolling heads are intended for rolling external threads.

A simple head will now be described for rolling internal threads, this rolling head being shown in Figs. 20 and 21. In this case the profile rolls 40a, 40b, 40c, are shorter than the barrels used for external threading and resemble rollers. They are mounted eccentrically between two plates 41a and 41 in such manner that the peripheral profile projects beyond the edges of the plates to penetrate into the surface of the workpiece 42. Apart from the foregoing this rolling head corresponds to that of Fig. 12, except for the fact that for releasing, the profile rolls 40a, 40b, 40c do not move more radially outwards but are swung inwards in the direction of the arrows in Fig. 20. This method of operation is only possible with workpieces of a relatively large internal diameter. For smaller bores the gear wheels 43 must be omitted and the bearing pins of the profile rolls 40a, 40b, 40c, must be toothed. For still smaller diameters adjustability of the rolls can be omitted and the mounting shaft 44 be connected directly to the plate 41. For rolling very small bores, instead of three rolls 40a, 40b, 40c, two rolls only may be used, the profile ridges of which are offset by half the thread pitch.

What we claim is:

A thread rolling head comprising first and second spaced and parallel plates having an axis, a hollow shaft coaxial with said plates slidable and journalled relative thereto, first and second jaw clutch parts connected between said shaft and said second plate, a plurality of spindles journalled in said plates, eccentric portions on said spindles between said plates, thread rolls freely journaled on said eccentric portions, drive means interconnecting said shaft and each of said spindles for rotation of said spindles upon relative rotation of said shaft and said second plate to move said eccentric portions and the rolls thereon toward and away from said axis, a single coiled spring normally lying in a single plane for interconnecting said shaft and said second plate with said jaw clutch parts axially in a rotatively locked position and said spring also in a wound condition, said shaft and plate, spindle and roll assembly having means associated therewith to create axial movement therebetween at the end of a rolling operation to disengage said clutch parts of the shaft and second plate away from said rotatively locked position whereby the unwinding of the spring moves said rolls away from their relatively closely spaced relation to each other through the agency of said eccentric portions and whereby said relative axial movement also distorts said spring out of said plane and the axial urge created in said spring being sufficient to bring said parts together so that said jaw clutch may be rotated into locked position.

References Cited in the file of this patent

UNITED STATES PATENTS

| | | |
|---|---|---|
| 42,849 | Flotow | Apr. 4, 1888 |
| 885,068 | Moy et al. | Apr. 21, 1908 |
| 964,272 | Kaiserman | July 12, 1910 |
| 1,017,888 | Landis | Feb. 20, 1912 |
| 1,846,296 | Williamson | Feb. 23, 1932 |
| 1,880,742 | Bosworth | Oct. 4, 1932 |
| 2,011,761 | Handel | Aug. 20, 1935 |
| 2,651,224 | Erdelyi | Sept. 8, 1953 |

FOREIGN PATENTS

| | | |
|---|---|---|
| 645,529 | Germany | May 28, 1937 |
| 844,080 | France | July 18, 1939 |